Aug. 7, 1962

E. R. ANDREGG 3,048,660

TELEPHONE PAY STATION SYSTEM

Filed July 31, 1958

INVENTOR
E. R. ANDREGG
BY
John E. Cassidy
ATTORNEY

United States Patent Office 3,048,660

Patented Aug. 7, 1962

3,048,660

TELEPHONE PAY STATION SYSTEM

Ernest R. Andregg, Newark, N.J., assignor to Bell Telephone Laboratories, Incorporated, New York, N.Y., a corporation of New York Filed July 31, 1958, Ser. No. 752,371
4 Claims. (Cl. 179—6.3)

Figure 1:
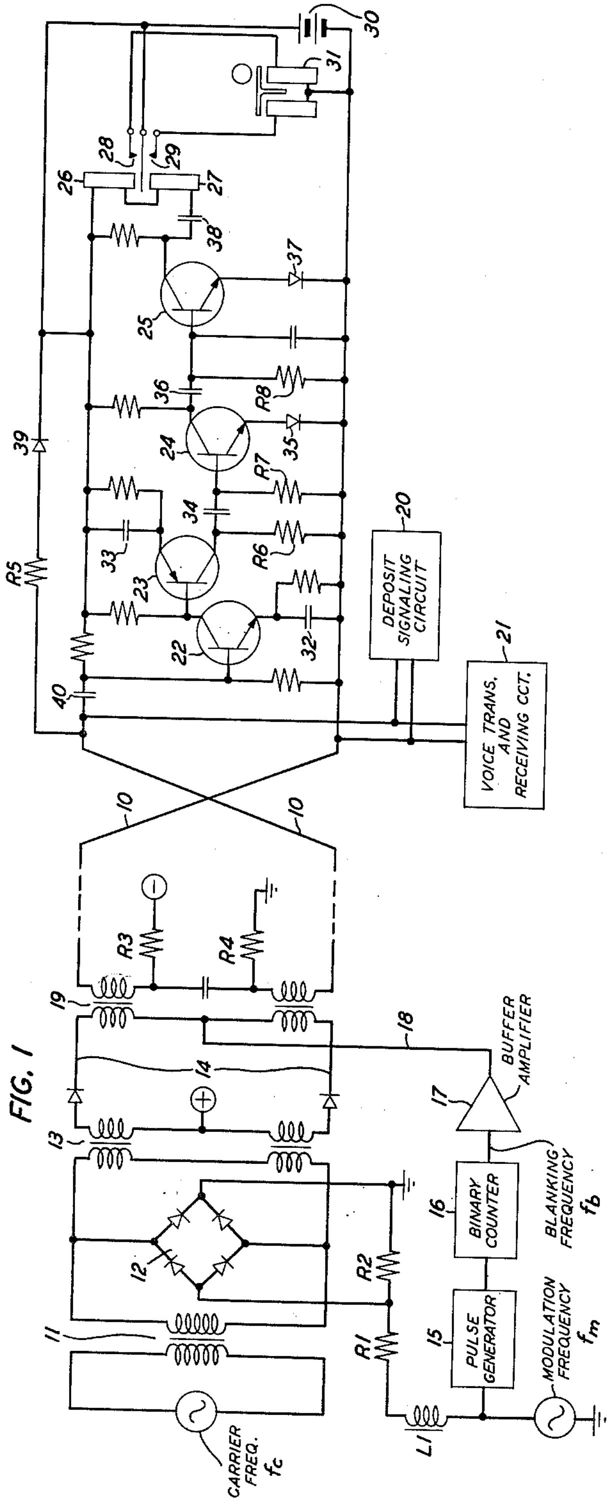

This invention relates to apparatus for the transmission and reception of voice frequency pulse modulated signals. Particularly, this invention relates to the use of such signals for controlling coin-deposit disposition apparatus located at remote telephone pay stations.

The present trend in telephone apparatus development is toward the utilization of electronic equipment rather than the heretofore employed electro-mechanical devices. This electronic equipment has recently taken the form of solid-state devices such as transistors. Due to the inherent characteristics of such devices, special requirements are demanded of substation equipment which is to operate in conjunction therewith. Among these are: the equipment must be responsive to low current signals, it must present matched impedance to the line, and it must be isolated from ground.

A still further development in the telephone field is the increasing use of line concentrators. These too, impose restrictions upon the characteristics of substation equipment. It is found, for instance, that polarity reversal for the control of deposited coins is no longer feasible on lines connected through line concentrators. Among the solutions which have arisen for coin control, in view of the above requirements, is the use of alternating-current signals. This invention concerns itself with such control of telephone pay stations.

Two prime factors involved in any telephone pay station system are the efficient transmission of coin control signals and the effective guarding against fraudulent imitation of these signals.

In general, and because line attenuation rapidly increases with frequency, the range of frequencies that can be efficiently transmitted on telephone lines at reasonable energy levels is approximately 0 to 3500 cycles per second. This means that the range of customer generated aural frequencies overlaps the range of useful alternating-current signaling frequencies. Therefore, in order to provide deposit control signals sufficiently free of the possibility of imitation, by voice or by means of some simple device, the control signals must not be capable of simulation by an easily produced single frequency tone. Many well-known signals meeting this requirement are available; for example, amplitude, frequency, or phase modulated waves. Other signaling techniques might include the utilization of a long duration single frequency tone or a unique combination of frequencies. However, another factor to be considered in effective control signaling is that the bandwidth of the signals should preferably be narrow in order to limit the number of modulation products that enter the circuit. The above suggested signals do not provide a sufficiently narrow bandwidth in application.

An object of the invention is the provision in a telephone pay station system of apparatus responsive to distinct alternating-current signals for controlling deposit disposal operations.

Another object is the provision of a pay station responsive to signals which are compatible with line concentrator operation.

A further object of the invention is the provision of a telephone pay station operative on low values of current and isolated from ground.

Still another object is to provide telephone pay stations which will permit all lines to terminate in a matched impedance.

The above objects are achieved in this invention through the use of voice frequency signals that are both amplitude modulated and pulse modulated. It is well known that the transmission of pulses is more desirable from the point of view of accurate detection than is mere modulation of a carrier. It is also well known that more bandwidth is required for the transmission of square waves. To overcome this bandwidth limitation, the carrier frequency of this invention is modulated by a relatively low frequency sine wave. This signal is then pulsed at a frequency one-half the frequency of the sine wave.

A feature of the invention is thus the generation and employment of a narrow bandwidth alternating-current signal for the control of pay station equipment.

Another feature resides in the utilization of a transistor circuit for receiving and detecting amplitude and pulse modulated voice frequency signals.

A further feature is the control of coin disposal equipment at a telephone pay station by distinct amplitude and pulse modulated signals.

Still another feature is the provision in a telephone pay station system for trickle charging a local direct-current potential source.

The embodiment chosen to disclose this invention is a telephone pay station system having coin disposal means at the pay stations controlled by alternating-current signals. These signals are received and detected at the pay station by transistor circuitry which is powered by a local potential source. For purposes of discussion, the signals may be of the following composition, assuming that only two control signals are required, one to initiate collection of deposit and the other to initiate refund. The carrier frequencies may be 2640 and 2320 cycles per second, respectively, the amplitude modulating frequencies 660 and 580 cycles per second, respectively, and the pulse modulating frequencies 330 and 290 cycles per second, respectively. For maximum efficiency 100 percent signal modulation should preferably be maintained, experience having shown that such modulation is difficult for the human voice to reproduce. It must be clearly understood that the frequency values cited are merely exemplary and should in no way restrict the invention. Any similar frequencies coming within the teachings of this invention may be employed.

Figure 2:
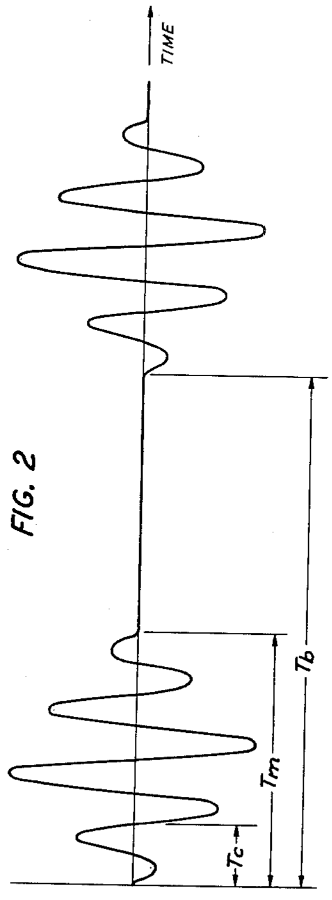

The foregoing as well as additional objects and features of the present inventoin will be more clearly understood and appreciated from the following description to be considered in conjunction with the accompanying drawing wherein:

FIG. 1 is a circuit schematic showing a single signal generation circuit connected to a coin disposal receiving circuit as contemplated by the invention; and FIG. 2 is a waveform of the signal contemplated for use in this invention;

FIG. 1 is composed of two basic parts; that on the left side comprising central office equipment and that on the right comprising telephone pay station equipment. For purposes of illustration these equipments are connected together by transmission line 10. The pulse modulation circuit disclosed in FIG. 1 is designed to produce a waveform of the nature disclosed in FIG. 2. It will be seen that this waveform is produced by first generating a carrier frequency $f_c$ of period $T_c$, modulating 100 percent by modulation frequency $f_m$ of period $T_m$, and then gating the product with a square wave of frequency $f_b$ having period $T_b$. Such a signal is generated by the circuit in the left-hand portion of FIG. 1 and connected to transmission line 10 by transformer 19.

It should be noted that in the subsequent discussion only a single amplitude and pulse modulated frequency will be considered. In the actual operation of a circuit of this nature it is, of course, understood that two such signals are required to yield a fully functioning system.

Carrier frequency $f_c$ is applied to diode bridge modulator 12 via transformer 11. Modulating frequency $f_m$ is introduced into modulator 12 by the voltage appearing across resistor R2 which is in series with source $f_m$, inductance L1, and resistance R1. The output of modulator 12 is applied, via transformre 13, to series blocking diode modulator 14 in which a blanking signal is applied on lead 18 to provide a signal having the waveform illustrated in FIG. 2. The blanking signal is derived from modulating frequency $f_m$ which drives pulse generator 15, binary counter 16, and finally buffer amplifier 17. The specific circuitry employed for developing pulse generator 15, binary counter 16, and buffer amplifier 17, may be any of the many forms well known to those skilled in the art.

Before considering the specific application of a signal, such as that described as present in transformer 19, to line 10, several elements of the pay station circuit should first be identified. Three distinct pieces of apparatus are illustrated as being connected to transmission line 10. These are: deposit signaling circuit 20; voice transmission and receiving circuit 21; and the hereinafter described signal receiving and detecting circuit. Circuits 20 and 21 may take the form of those disclosed for performing their respective functions in the currently pending application of W. D. Goodale, Jr.—W. Pferd, Serial No. 591,116, filed June 13, 1956. The equipment employed in this invention is such that the impedance of both deposit signaling circuit 20 and the signal receiving and detecting circuit to be discussed hereafter, is high in comparison with voice transmitting and receiving circuit 21, thus minimizing bridging effects which impair speech transmission.

The receiving circuit shown is composed of six basic building blocks: a limiter amplifier circuit comprising transistors 22 and 23 and associated circuitry; a pulse shaper comprising transistor 24 and associated circuitry, a detector and amplifier comprising transistor 25 and associated circuitry; frequency responsive relays 26 and 27; coin disposal relay 31; and a trickle charge circuit comprising resistor R5 and diode 39. The particular form of frequency sensitive relays 26 and 27 contemplated in this illustrative embodiment is the tuned reed type of the nature disclosed in Patent No. 2,694,119, granted to Le Roy Armitage on November 9, 1954. Equivalent types of relays are, of course, usable without departing from the basic concepts of this invention.

For more specific analysis of the receiving and detecting circuit, it will be assumed that a signal similar to that depicted in FIG. 2 is applied over transmission line 10 to the pay station circuitry. This signal is received at the limiter amplifier which is a conventional two-stage, class A, common emitter amplifier, having n-p-n transistor 22 directly coupled to p-n-p transistor 23. The gain of these two stages is adjusted by appropriate settings of the bias currents in the well-known fashion to ensure that the second stage is always driven into the current saturation region on the positive half cycle of the incoming signal and is cut off on the negative half cycle. Emitter by-pass capacitors 32 and 33 are selected to provide low frequency filtering. In view of this circuit arrangement, therefore, the signal appearing across resistor R6 is both positively and negatively limited to predetermined amplitudes. The limited signal appearing across resistor R6 is differentiated by capacitor 34 and resistor R7 to form a fast rising positive pulse that decays on an exponential curve when the signal goes positive and a similar negative pulse when the signal goes negative.

The differentiated signal is applied to the base of n-p-n transistor 24 which is biased to operate as a class C amplifier. The output appearing at the collector of transistor 24 consists entirely of negative pulses having a frequency equal to the carrier frequency $f_c$ and an envelope having a period $T_m$. The polarity of these signals is due to the signal inversion between the base and collector electrodes. The small forward voltage drop across diode 35 and the effective diode between the base and emitter of transistor 25 provides a sharp triggering threshold. The pulse shaper thus yields low frequency rejection by limiting the pulse width as well as the pulse amplitude.

A low pass filter consisting of capacitor 36 and resistor R8 acts upon the output of transistor 24 and applies it to the base of n-p-n transistor 25. The value of capacitor 36 is chosen to give the most advantageous response time for guarding against signal imitation. Increasing the value of capacitor 36 increases the response time and vice versa, as is well known by those skilled in the art. In receiving a train of information, the response time controlled by capacitor 36 will diminish after the first bit of information in the train is received due to the unsymmetrical charge and discharge path of capacitor 36.

The signal is amplified by transistor 25 and applied via capacitor 38 to series-connected relays 26 and 27. The signal at the collector of transistor 25 is a train of square pulses having duration $T_m$ and period $T_b$. Relays 26, 27, as already noted, are frequency sensitive and respond selectively to the pulse frequency received. Thus, when the modulation frequency is that chosen to initiate the collect operation, one of these relays will operate, whereas when the modulating frequency is that chosen to initiate the refund operation the other relay will operate. This relay operation is effective to close either contacts 28 or 29, thereby connecting local source 30 to coin relay 31 with the appropriate polarity to perform the desired operation. Coin relay 31 is of the standard type, operative in response to one polarity for collecting coins and in response to the other polarity for refunding coins.

In order to obtain maximum selectivity, relays 26 and 27 most advantageously will have a narrow band frequency characteristic, thus limiting the possibility of fraud and permitting more efficient signal transmission. Although only two frequency sensitive relays are disclosed in this illustration others may be employed, each individually responsive to a different frequency, and each controlling distinct operations. Furthermore, it is not considered necessary that individual relays be utilized. In fact, a single structure having several frequency sensitive elements may be employed.

This invention contemplates the employment of a trickle charge circuit for maintaining the local supply 30 at a fully charged level. The charge circuit originates at the central office in ground and extends through the following components: resistor R4, lower secondary winding of transformer 19, transmission line 10, resistor R5, diode 39, local supply 30, transmission line 10, upper secondary winding of transformer 19, resistor R3, and line battery.

The above detailed description is merely illustrative of one embodiment of the present invention and it is not intended to limit the invention to this single embodiment. Other control operations to be performed at remote locations via transmission lines will be obvious to those skilled in the art, and may be developed without departing from the spirit or teachings of this invention.

What is claimed is:

1. A telephone system having a pay station connected by a line to a central office comprising signal means at said central office for producing and transmitting control signals over said line to said pay stations, said control signals comprising a carrier frequency, modulated by substantially sinusoidal current and pulses of predetermined frequencies, detection means at said pay station for detecting the particular modulation present on said carrier frequency, coin disposal means at said pay station, and means controlled by said detection means for operating said coin disposal means in accordance with the particular modulation present.

2. In a telephone system having a pay station connected by a line to a central office, signal means at said central office for producing and transmitting control signals over said line comprising distinct voice-frequency carrier frequencies with particular amplitude and pulse modulation thereon, means at said pay station for limiting and detecting said carrier frequencies to ascertain the particular modulation present, coin disposal means at said pay station selectively operative in response to an applied potential to collect or refund deposited coins, a potential source at said pay station, and frequency sensitive means controlled by the output of said detecting means for connecting said potential source to said coin disposal means in accordance with the particular modulation detected.

3. A telephone system as defined in claim 2 in combination with means for charging said potential source from said central office over said line.

4. In a telephone system having a pay station connected by a line to a central office, signal means at said central office for producing and transmitting control signals over said line, each of said control signals comprising an audio frequency carrier wave which has been modulated by an alternating current having a frequency fractionally related to said carrier wave and by a square wave causing periodic blanking at a rate equal to one-half of the frequency of said alternating current, means at said pay station for limiting and detecting said control signals to ascertain the particular modulation present, coin disposal means at said pay station selectively operative in response to an applied potential to collect or refund deposited coins, a potential source at said pay station, and frequency sensitive means controlled by the output of said detecting means for connecting said potential source to said coin disposal means in accordance with the particular modulation detected.

References Cited in the file of this patent

UNITED STATES PATENTS

| | | |
|---|---|---|
| 2,265,203 | Six | Dec. 9, 1941 |
| 2,336,768 | Six et al. | Dec. 14, 1943 |
| 2,719,955 | Thompson | Oct. 4, 1955 |
| 2,955,161 | Faulkner | Oct. 4, 1960 |

FOREIGN PATENTS

| | | |
|---|---|---|
| 403,508 | Great Britain | Dec. 28, 1933 |
| 670,703 | Great Britain | Apr. 23, 1952 |